INVENTOR
L.K. MURRAY
BY Young & Quigg
ATTORNEYS

April 30, 1968     L. K. MURRAY     3,380,719

APPARATUS FOR QUENCHING HOT REACTOR GASES

Filed Sept. 1, 1966     2 Sheets-Sheet 2

INVENTOR
L. K. MURRAY

BY Young & Quigg

ATTORNEYS

# United States Patent Office 3,380,719
Patented Apr. 30, 1968

3,380,719
APPARATUS FOR QUENCHING HOT
REACTOR GASES
Lawrence K. Murray, Bartlesville, Okla., assignor to
Phillips Petroleum Company, a corporation of
Delaware
Filed Sept. 1, 1966, Ser. No. 576,757
3 Claims. (Cl. 261—115)

ABSTRACT OF THE DISCLOSURE

A vertical quench tower for carbon black and the like having a frusto-conically shaped baffle means positioned near the bottom thereof and extending partially into the inlet flow path. Upwardly and inwardly directed nozzles extend from the inside of the tower and are positioned below the baffle so that substantially only the nozzle tip thereof will extend through the baffle. Hot reactor gases passed through the inlet will be at least partially deflected through a 180° turn upon contacting the baffle to remove any undesired entrained solid particles. Any solid particles that had originally collected on the interior, of the vessel in the form of coke and then broken loose and fall, will be deflected by the baffles to avoid damage to the spray nozzles.

---

Figure 1:
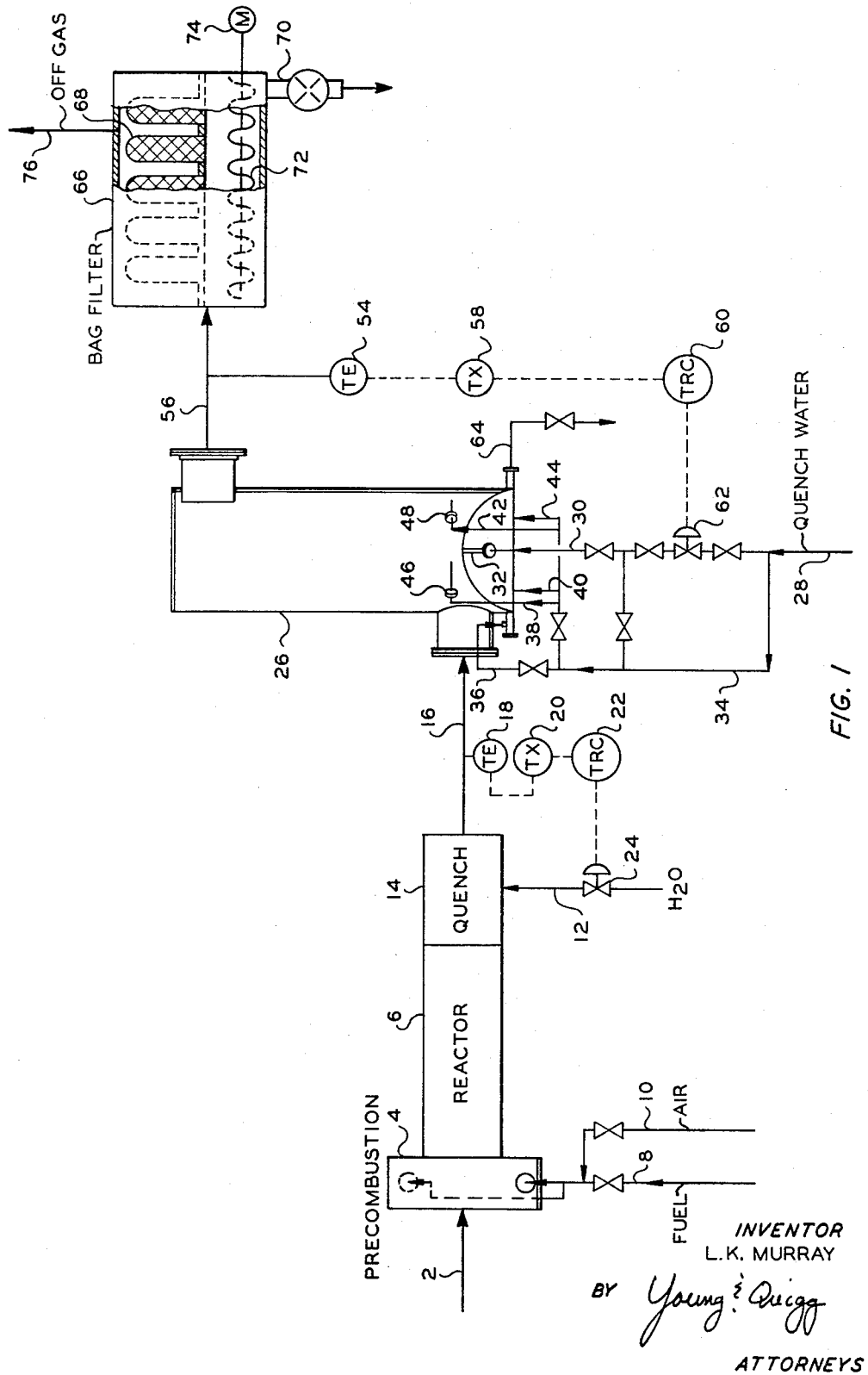

This invention relates to quenching hot reactor gases. In one of its aspects it relates to a quench tower for quenching hot gases from a carbon black furnace in which a means is provided near the entrance of the gases to cause a drop out of grit particles and a means is further provided to prevent heavy deposits of carbon black from damaging quench spray nozzles.

In the manufacture of carbon black it is conventional practice to pass hot reactor gases into a quench tower wherein the gases are sprayed with water or other quenching medium, and then to pass the quenched gases to a filtering zone in which the carbon black is separated from gases. Occasionally grit particles such as refractory bits are entrained in the reactor effluent gases. If these grit particles are carried through to the filters, they contaminate the carbon black product and can damage the bag filters used in the filtering zone.

Further, in a vertical quench tower, carbon black collects on the walls and periodically falls down into the bottom of the quench tower. The weight of the carbon black can be quite substantial and falling of caked carbon black can cause damage to the spray nozzles which project into the quench tower.

I have now discovered that these problems can be overcome by providing a baffle which extends a portion of the distance of the path of the incoming gas to the quench tower to divert the gases to cause a reverse flow, thereby separating out undesirable grit particles, and by providing a baffle in the quench tower which covers the spray nozzles so that falling caked carbon black cannot damage them.

By various aspects of this invention, one or more of the following, or other, objects can be obtained.

It is an object of this invention to provide an improved apparatus for producing carbon black.

It is a further object of this invention to provide an improved apparatus for quenching hot carbon black reactor effluent gases.

It is a further object of this invention to eliminate refractory particles and other grit bits from a carbon black containing gas stream.

It is a still further object of this invention to prevent damage of spray nozzles in vertical quench towers for carbon black production.

Other aspects, objects, and the several advantages of this invention are apparent to one skilled in the art from a study of this disclosure, the drawings, and the appended claims.

According to the invention there is provided a novel quench tower for hot reactor gases. The quench tower has an inlet means at one end thereof, an outlet means at another end thereof, and at least one spray nozzle directed inwardly from the outer portion of the quench tower to supply a quenching medium to the gases passing through the quench tower. According to the invention, there is provided a grit removal means upstream from the quenching section of the quench tower. In a preferred embodiment the grit removal means comprises a means at least partially in line with the flow of gases in the inlet means to at least partially divert the flow of gases away from the outlet end to thereby separate any undesirable solid particles contained within the gas stream.

In one embodiment, the quench tower is vertical, the spray nozzles are diverted upwardly and inwardly, the inlet means is at the bottom and the outlet means is at the top of the quench tower and there is provided a second baffle means extending downwardly and inwardly above the spray nozzles with the spray nozzles projecting through the baffle means to thereby protect the spray nozzles from materials which can cake on the walls and fall down into the lower portion of the quench tower.

In another embodiment, the quench tower cools hot reactor gases from a carbon black reactor.

In still another embodiment, the first and second baffle means are integrally connected to form a downwardly directed frusto-conically shaped baffle.

Figure 4:
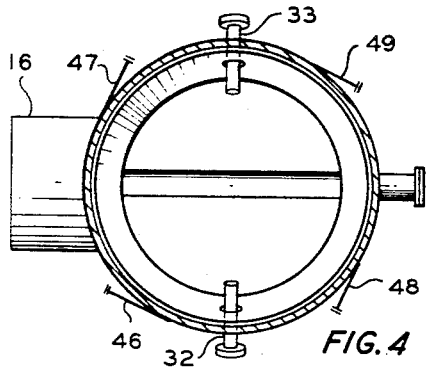
Figure 2:
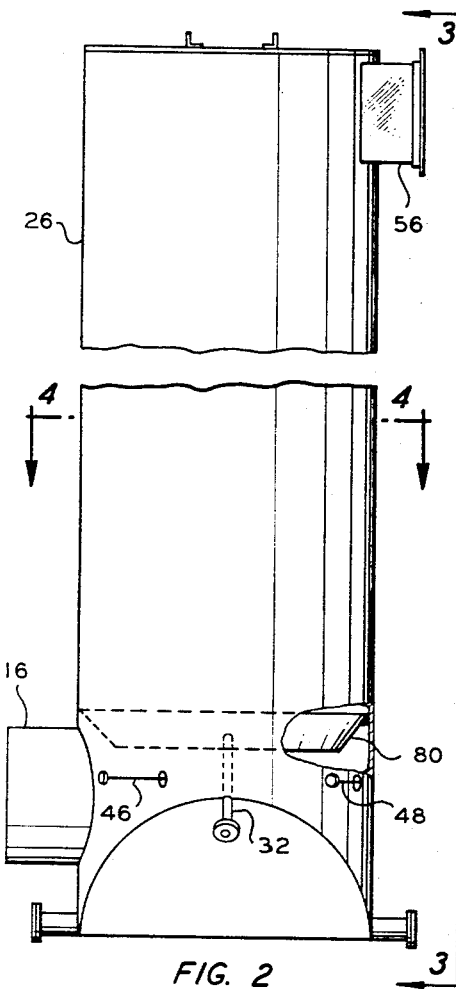
Figure 3:
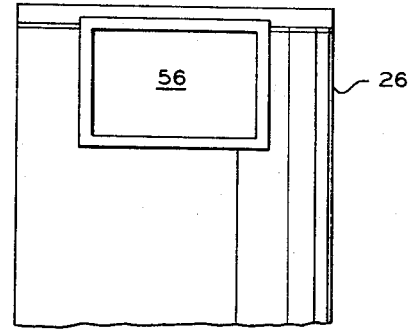
Figure 3:
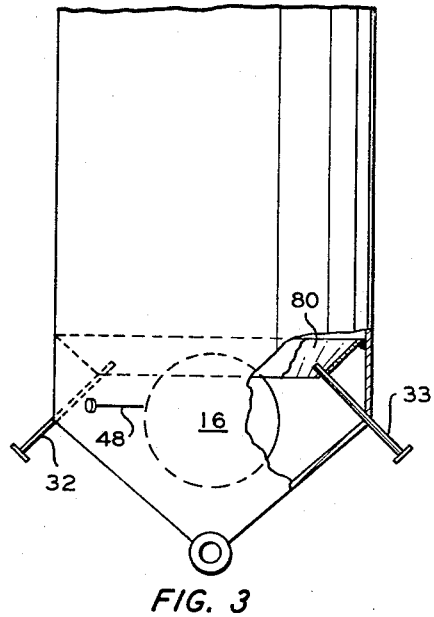

The invention will now be described with reference to the accompanying drawings in which FIGURE 1 is a diagrammatic representation of a carbon black process incorporating the novel quench tower according to the invention; FIGURE 2 is a view partially in section of the quench tower shown in FIGURE 1; FIGURE 3 is a view along lines 3—3 of FIGURE 2; FIGURE 4 is a view along lines 4—4 of FIGURE 2; and FIGURE 5 is an isometric view of the baffle means employed in the quench tower shown in FIGURES 1–4.

Referring now to the drawings, and particularly to FIGURE 1, a hydrocarbon fuel suitable for use in making carbon black is passed through line 2 to precombustion section 4 of a carbon black reactor wherein it is contacted with fuel which is passed to precombustion section 4 through line 8 in admixture with air flowing in line 10. The mixture is passed into reactor section 6 wherein carbon black is formed due to the heat produced by burning the fuel of line 8. The reaction products pass into quench section 14 where they are contacted with water which enters the quench section through line 12. The partially quenched products are passed through line 16 into quench tower 26 wherein they are contacted with quench water passed through lines 28, 30 and nozzles 32 and 33 (see FIGURE 3). The quenched gases are removed from quench tower 26 through line 56 to bag filtering means 66 wherein the carbon black is retained in bag 68 and the off gas is removed through line 76. Periodically, the carbon black is removed from bag 66 and is passed from filter section 66 by a screw conveyor 72 powered by motor 74 and through outlet means 70.

The temperature of the hot exhaust gases from the carbon black reactor is controlled according to a temperature sensed by temperature sensor 18 which transmits a signal to temperature transmitter 20 which in turn sends a signal proportional to the temperature in line 16 to temperature recorder controller 22 and according to a predetermined set point will regulate the flow of water through line 24 to maintain a predetermined temperature in line 16. Periodically, carbon black cakes on the walls of quench tower 26 and falls to the bottom thereof. Other caking carbon black located on the walls in the lower part of the quench tower can be removed through tangential spray nozzles 46, 48, 47 and 49 (FIGURE 4) which the spray nozzles direct a tangential spray of water around the bottom portion of the reactor to wash the carbon black therefrom. The carbon black which falls into the trough in the very bottom of the quench tower can be removed by periodically injecting water through line 34, line 36, through the trough at the bottom of quench tower 26 and out through line 64. Nozzles 46, 47, 48 and 49 are supplied with water through lines 38, 40, 42 and 44, respectively. A temperature sensor 54 in line 56 senses the temperature of the effluent gases in line 56 and accordingly transmits a signal through transmitter 58 to temperature recorder controller 60 which according to a fixed set point adjusts the flow of quench water through line 62 to nozzles 32 and 33.

Figure 5:
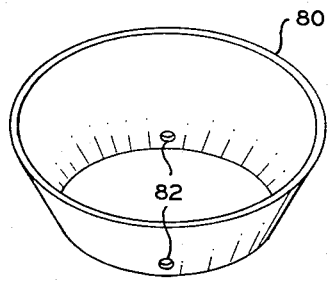

Referring now to FIGURES 2–5, hot reactor gases entering quench tower 26 through inlet line 16 are deflected downwardly to some extent by baffle means 80 which, as can be seen from FIGURE 5, is a downwardly and inwardly extending frusto-conically shaped ring. Spray nozzles 32 and 33 extend into the quench chamber upwardly and inwardly through holes 82 in baffle means 80. As can be seen from FIGURE 3, the baffle means extends downwardly into the path of the incoming gases a portion of the distance from the top of inlet line 16 to the center thereof. Generally, the baffle means will extend down less than one-half of the distance from the top to the center of the flow path of the incoming gases, or one-sixth of the distance from one side of the flow path to the other side; preferably, the baffle means will extend into the incoming gas flow path less than one-fourth of the distance from the top to the center, or one-eighth of the distance from one side of the flow path to the other. The baffle means in the flow path causes the hot reactor gases to be forced downwardly, then upwardly through the central area surrounded by the baffle and up the quench tower. Thus, the baffle tends to cause the reactor gases to pass through a 180° turn rather than a 90° turn with no baffle. This 180° turn will be sufficient to remove a substantial portion of undesirable grit particles from the gas stream without causing a substantial decrease in the speed of the gas stream passing through the quench tower. Further, the positioning of the baffle in the position so shown, and the shape of the baffle, i.e., the downwardly and inwardly extending frusto-conical shape, permits the solid particles to be forced underneath the downwardly extending baffle when they are thrown to the outer portion of the quench tower due to the reverse turn.

Frequently, carbon black will cake on the upper walls of the quench tower 26. After a sufficient amount has built up on the walls, it will fall off and fall downwardly into the bottom portion of the quench tower. The positioning of the baffle means 80 over spray nozzles 32 and 33 protects them (except the tips) from damage by the falling caked carbon black.

As a specific example of the invention, the following conditions are given which exemplify the operating conditions of a quench tower for quenching hot carbon black reactor gases.

|  | Pressure, p.s.i.g. | Temperature, °F. | Velocity, ft./sec. |
| --- | --- | --- | --- |
| Inlet (line 16) | ¾ | 1.000 | 160 |
| Outlet (line 56) | ~½ | 450 |  |

Tower height, 28 feet. Tower diameter, 4½ feet.

Reasonable variation and modification are possible within the scope of the foregoing disclosure, the drawings and the appended claims to the invention without departing from the spirit thereof.

I claim:
1. A quench tower comprising an elongated vertically disposed tower having:
   (a) an inlet means communicating with the bottom thereof;
   (b) an outlet means communicating with the top thereof;
   (c) a downwardly and inwardly extending frusto-conically shaped baffle means having at least one nozzle aperture therethrough, said baffle means positioned adjacent the bottom of said tower and extending partially into the flow path formed by said inlet means;
   (d) at least one nozzle means extending inwardly and upwardly from the inside of said vessel and positioned below said baffle so that substantially only the nozzle tip thereof will extend through said aperture.
2. The quench tower of claim 1 wherein said baffle means extends into the flow path formed by said inlet means less than one fourth the distance across said flow path.
3. The apparatus of claim 2 further comprising at least one nozzle means extending tangentially into said tower below said baffle means.

References Cited

UNITED STATES PATENTS

| 2,813,040 | 11/1957 | Rowe et al. | 23—314 |
| 2,976,128 | 3/1961 | Latham et al. | 23—209.9 |
| 2,985,511 | 5/1961 | Norris et al. | 23—209.4 |
| 3,026,966 | 3/1962 | Asklof | 55—80 |
| 3,064,408 | 11/1962 | Erga et al. | 55—90 |
| 3,271,929 | 9/1966 | Bowden et al. | 55—52 |
| 3,307,923 | 3/1967 | Ruble | 23—209.9 |

OTHER REFERENCES

Chemical Engineering, vol. 57, September 1950, pp. 203 and 205, (copy in Scientific Library).

REUBEN FRIEDMAN, *Primary Examiner.*

C. HART, *Assistant Examiner.*